Jan. 4, 1955  E. F. ROSSMAN  2,698,675
SHOCK ABSORBER
Filed Dec. 3, 1951
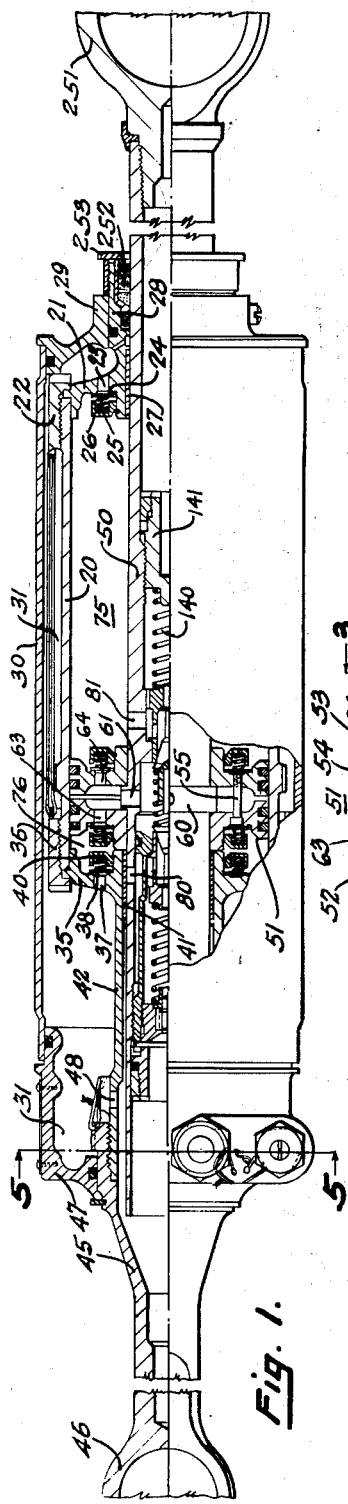
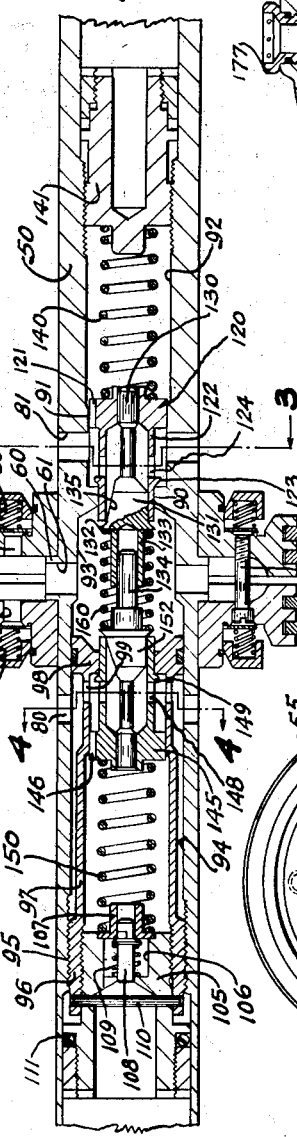
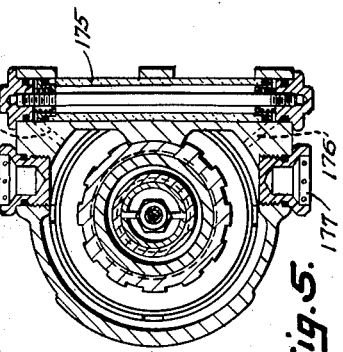
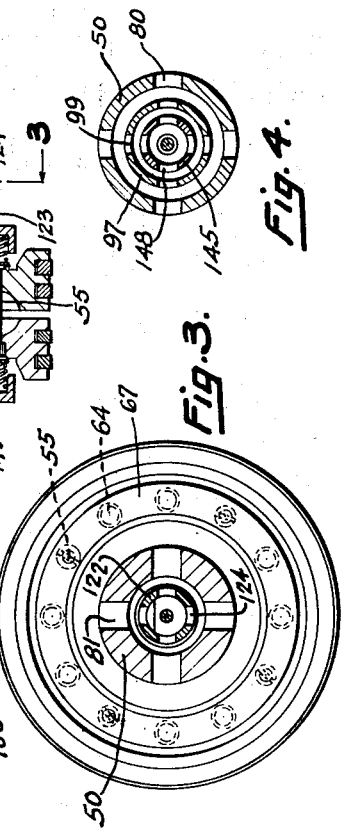
INVENTOR.
EDWIN F. ROSSMAN
BY
HIS  ATTORNEYS

United States Patent Office 2,698,675
Patented Jan. 4, 1955

2,698,675

SHOCK ABSORBER

Edwin F. Rossman, Dayton, Ohio, assignor to General Motors Corporation, Detroit, Mich., a corporation of Delaware Application December 3, 1951, Serial No. 259,606

11 Claims. (Cl. 188—88)

This invention relates to an improved, double acting hydraulic shock absorber.

It is among the objects of the present invention to provide a double acting hydraulic shock absorber of minimum size and weight, capable of predeterminately resisting the approaching and separating movements of two elements between which the shock absorber is connected and operable horizontally and in a centrifugal field.

Further objects and advantages of the present invention will be apparent from the following description, reference being had to the accompanying drawing wherein a preferred embodiment of the present invention is clearly shown.

In the drawing:

Fig. 1 is a part sectional view of the shock absorber constructed in accordance with the present invention.

Fig. 2 is an enlarged sectional view of the fluid displacement and flow control mechanism of the shock absorber shown in Fig. 1.

Fig. 3 is a transverse sectional view taken substantially along the line and in the direction of the arrows 3—3 of Fig. 2.

Fig. 4 is a transverse sectional view taken substantially along the line and in the direction of the arrows 4—4 in Fig. 2.

Fig. 5 is a sectional view taken along the line and in the direction of the arrows 5—5 in Fig. 1.

This shock absorber is particularly designed to be used on a helicopter to control the lag and lead motions of a rotor blade. Installations on aircraft need to be of minimum size and weight, of sturdy construction so as to be dependable and capable of performing their intended functions without failure.

As illustrated the shock absorber comprises a cylinder 20 exteriorly threaded at each end. One end of the cylinder 20 has an end head 21 clamped upon it by the clamping ring 22 threadedly engaging this end of the cylinder. The end head has a plurality of openings 23 normally closed by a ring valve 24 pressed against the inner side of the end head 21 by a plurality of springs 25 seated in a ring shaped retainer 26 which is securely attached to the end head 21 in any suitable manner. These valved passages or openings 23 in the end head provide for the introduction of fluid into the cylinder as will later be described. The end head 21 has a central bore in which a sleeve bearing 27 is provided for slidably supporting a tubular member as will later be described. A cylindrical extension 28 on the end head, coaxial with the opening supporting the bearing 27, has a ring shaped flange member 29 supported thereon, this ring shaped flange member engaging the end of the clamping sleeve or collar 22 and having one end of the tubular casing 30 secured thereto in any suitable manner, said casing 30 being of larger diameter than the cylinder 20 so as to form an annular space 31 around the cylinder which provides the fluid containing reservoir of the shock absorber.

The opposite end of the cylinder 20 has an end head 35 engaging it, said end head being clamped securely upon the end of the cylinder by the clamping ring or sleeve 36 threadedly engaging this end of the cylinder. Like end head 21, this end head 35 has an annular row of openings 37 normally closed by a ring valve 38 which is held against the inner surface of the end head 35 by a plurality of springs held in proper position by a retainer ring 40 secured to the end head 35 in any suitable manner. End head 35 is centrally apertured to receive the sleeve bearing 41 which is coaxial with the sleeve bearing 27 in the end head 21 and slidably supports the tubular member also supported in the bearing 27.

A tubular extension 42 of the end head 35 is exteriorly threaded at its outer end to receive the one end of a trunnion 45 the other end of which is shown to be ring shaped as at 46 providing means for attaching this end of the shock absorber to one of the relatively movable members whose movement of the shock absorber is adapted to control in this installation the rotor hub. A cup shaped member 47 is supported upon the trunnion 45 in any suitable manner, said cup shaped member providing an annular flange to which the one end of the outer casing 30 is attached. It will be seen that the space provided between the tubular extension 42 of the end head 35 and the casing 30 forms the one end of the reservoir 31 which is in communication with the exterior of the tubular extension 42 of the end head 35 through a series of openings 48 in said tubular extension 42.

The tubular rod or member which is slidably supported in the bearings 27 and 41 respectively carried in the cylinder end members 21 and 35 is designated by the numeral 50. The one end of this tubular rod 50 extends through the end head 21 to the exterior of the shock absorber and has the mounting ring or trunnion 251 secured thereto in any suitable manner said ring or trunnion providing the means by which the shock absorber is attached to the other relatively movable member whose movement the shock absorber is adapted to control in this installation an extension of the rotor blade. Any suitable packing 252 surrounds this rod and is contained within an annular space provided by the end head hammer 21, this packing being retained in rod clamping position by the gland 253 threadedly secured to the tubular extension 28 of the end head member 21. This packing reduces fluid leaks at this point to a substantial minimum.

The end of the rod slidably supported in the sleeve bearing 41 provided in the end head member 35 extends beyond this bearing and into the interior of the trunnion 45 which, as has been previously stated, is screw threadedly received by the end head member 35. Intermediate its ends the tubular rod 50 has an outwardly extending annular flange 60 in which a plurality of radial openings 61 are provided, said openings forming communications between the interior and the exterior of said tubular shaft 50. This shaft 50 supports the piston 51 of the shock absorber said piston consisting of two similar disclike portions 52 and 53 centrally apertured to fit over the tubular rod 50 and abut against the respective edges of the annular flange 60 on said rod in an oppositely disposed manner. The adjacent faces of these two disc-like portions 52 and 53 of the piston 51 are recessed to form an inner chamber 54 when said piston portions are assembled upon the rod 50. A plurality of screws or bolts 55, extending through the one disc 52, threadedly engage the other disc 53 and provide means for drawing the discs together tightly to clamp them in engagement with their respective sides of the annular flange 60 on the rod 50 whereby the piston assembly 51 is rigidly secured to the rod 50 so as to be reciprocated therewith. Each disc 52 and 53 has an annular row of through openings 63 and 64 respectively. A ring-shaped valve 65 is urged upon the outer surface of the disc 52 by a plurality of springs 66 normally to close the passages 63 in said disc and likewise a ring-shaped disc valve 67 is urged upon the outer surface of the disc 53 by springs 68 normally to close the passages 64 therein. The springs 66 and 68 are supported by ring-shaped retainers each of which are secured to the respective piston discs 52 and 53. These valves 65 and 67 prevent fluid from entering into the chamber 54 between the piston discs 52 and 53, but are operative in response to any fluid pressure within said chamber 54 to permit fluid to flow from said chamber through the respective discs 52 and 53 to the exterior thereof. The piston 51 slidably fits within the cylinder 20, each disc 52 and 53, making up the piston, having suitable expansive piston rings for facilitating a substantially leakproof engagement with the piston wall of the cylinder. Thus this piston 51 forms two fluid displacement chambers within the cylinder 20, the chamber designated by the numeral 75 being termed the "rebound chamber" and the one designated by the numeral 76 being termed the "compression chamber."

The shock absorber as shown in Fig. 1 is in fully compressed position where the piston has reached its limit of inward movement. Thus the opening 80 in the wall of the tubular rod 50 is within the confines of the sleeve bearing 41 supported within the end head 35. As soon as the rod 50 is moved outwardly of the shock absorber on its rebound stroke, sufficiently to bring the opening 80 outside of the confines of the sleeve bearing 41, the interior of the tubular rod 51 will be in communication with the cylinder compression chamber 76. A similar opening 81 in the tubular piston rod 50 provides communication between the interior of said rod and the rebound chamber 75 of the cylinder 20. The radial openings 61, through the annular flange 60 on the tubular rod 50, provide constant communication between the interior of said rod and the interior chamber 54 within the piston assembly 51.

The piston 51 is reciprocated within the cylinder 20 by movements of the members between which the shock absorber is mounted. Reciprocation of the piston within the cylinder 20 displaces fluid from one displacement chamber to the other dependent upon the piston reciprocation. For instance, if the piston 51 is moved through its rebound stroke from the position as shown in Fig. 1, fluid within the rebound chamber 75 will be forced through the openings 81, in the tubular rod 50, into said tubular rod and thence through the opening 61 in the tube, into the chamber 54 within the piston and out through the passages 63, the fluid pressure moving the valve 65 from engagement with the piston section 52 to permit fluid flow into the compression control chamber 76 of the cylinder. In order that the shock absorber will provide the proper resistance to such separation movements of the relatively movable members between which it is mounted, fluid flow control mechanism is provided within the tubular rod 50 for restricting the flow of fluid through said tubular rod on its way from the rebound chamber 75 into the compression chamber 76. Fig. 2 more clearly illustrates this fluid flow control mechanism.

The rod 50 is hollow throughout its complete length. The inner passage throughout the complete rod 50 has areas of different inside diameters, for instance, adjacent the radial openings 61 in said rod there is provided an inwardly extending, annular flange 90 providing the smallest diameter portion of this inner opening in the rod 50. To the side of this inner annular flange opposite the radial openings 61 there is provided an opening portion 91 of greater diameter than the opening presented within the annular flange 90. The openings 81 in the wall of the tubular rod 50 communicate with this portion 91 inside the rod. The remaining portion 92 of this inner opening in the rod 50 is of a diameter slightly larger than the portion 91 and extends substantially to the outer right end of rod 50 or more particularly the end to which the mounting ring 51 is attached. The portion 93 within the rod, which is the portion between the openings 61 and the annular flange 90 and into which the openings 61 open is of larger diameter than the portion 91 and slightly smaller in diameter than the opening portion 94 which extends through the tubular rod 50 substantially to the end portion of the rod extending into clevis 45 as shown in Fig. 1. The openings 80 in the tubular rod 50 communicate with this larger diameter opening in said rod. Interior screw threads 95 in rod 50 provided near the end of the rod which extends into clevis 45 receive the screw threaded end portion of a supporting sleeve 96 which has a body portion 97, the outer diameter of which is smaller than the inner diameter portion 94 of the tubular rod 50 so as to provide an annular space between said sleeve and inner wall portion of the tubular rod. The inner end of said sleeve, or more particularly the end thereof more adjacent the middle portion of the tubular rod has an outwardly extending annular flange 98 which fits snugly within the portion 94 of the tubular rod 50, this annular flange having an annular groove in which any suitable sealing ring is provided to insure against fluid leakage at this point. The openings 80 in the tubular rod 50 communicate with the annular space between the sleeve portion 97 and the inner wall 94 of said tubular rod. A series of openings 99 in the wall of the sleeve adjacent its annular flange 98 provide communication between said annular space and the interior of said sleeve.

The end portion of the sleeve 96, threadedly received by the tubular rod 50 is also interiorly threaded to receive a plug 105 centrally recessed as at 106. The inner surface of this plug has a sleeve 107 engaging it, said sleeve providing an annular edge forming a valve seat for the plug valve 108 urged against said sleeve by a spring 109. This plug valve 108 is so constructed that when urged against the sleeve 107 it prevents any fluid flow through the sleeve. However, when fluid pressure against the plug valve moves it relatively to the sleeve 107 the hollow pilot portion of said plug valve extending into said sleeve is adapted to provide an opening through which fluid may flow from the interior of the sleeve portion 97 through the sleeve 107 past the valve 108 and thence through the tubular rod 50 into the space within the clevis 45, thence through the openings 48 in the end head member 35, into the reservoir chamber 31. A locking pin 110 extending through openings in the plug 105 and in the end of the sleeve 96 secures the plug to the sleeve and prevents any movement relatively therebetween. Any suitable sealing means 111 is provided on the plug to engage the inner surface of the rod 50 to prevent leaks at this point. It will be noted that at the end of the sleeve portion 97 provided with the outwardly extending flange 98 there is a central opening which is of the same diameter as the opening presented by the inwardly extending flange 90 in the tubular rod 50, these two openings being in coaxial alignment. The part of the sleeve portion 97 provided with the openings 99 is substantially of the same diameter as the portion 91 of the tubular rod 50.

The fluid flow control mechanism for regulating the flow of fluid between the two compression chambers of the cylinder comprises two separate, spaced valve assemblies each of these valve assemblies having an identical casing portion slidably supported within the tubular rod 50. The one end 120 of a valve casing portion is of a diameter such as slidably to fit within the portion 91 of the tubular rod 50. This portion of the casing has a cut away area 121 providing a passage between said casing end 120 and the inner wall of the tubular rod 50. The remaining portion of the valve casing designated by the numeral 122 is of an outside diameter so as slidably to fit within the opening provided by the annular flange 90 in the tubular rod 50. An outwardly extending annular flange 123, provided on the casing portion 122, engages and seats upon the inner peripheral edge of the opening provided by the flange 90 thus limiting the movement of this valve casing toward the central portion of the tubular rod 50. The casing portion 122 is recessed to provide an inner chamber which is in communication with the openings 81 in the tubular rod 50 through a series of openings 124 in the casing portion 122. The flange end portion 120 of the casing has a central through-opening of substantially smaller diameter than the recess in the portion 122, this central opening in the flange portion 120 of the casing having the end 130 of the plug valve slidably supported therein. This plug valve has a head portion 131 slidably fitting into the recessed end of the portion 122 of the casing, the intermediate portion between the head portion 131 and the portion 130 of the plug valve being of reduced diameter so as to provide a chamber within the casing portion 122 and with which the openings 124 communicate. The head portion 131 of the plug valve has an outwardly extending, annular flange 132 which is adapted to engage and seat upon the end of the recessed portion 122 of the casing thereby completely closing said casing at this end. Extending from the head portion coaxially and toward the central portion of the tubular rod 50 there is a tubular portion 133 for telescopically receiving a rodlike extension 134 provided on the other, oppositely disposed valve mechanism as will later be described. The head portion 131 of the plug valve has a sloping cut away portion 135 starting at the inner edge of the annular flange 132 at the head portion 131 and tapering downwardly toward the reduced diameter of the intermediate portion of said plug valve. This sloping cut away portion provides a progressively enlarging valve opening between the head portion 131 of the plug valve and the inner annular wall of the recessed portion 122 of said casing as said valve head 131 is actuated to move its flange 132 away from and out of engagement with the end of the recessed portion 122 of said valve casing. The valve casing itself is urged into normal position so that its outwardly extending annular flange 123 engages the annular edge of the inwardly extending annular flange 90 in the tubular rod 50, by a spring 140 interposed between said valve casing and a closure member 141 threadedly secured within the tubular rod 50.

The casing 145 of the other oppositely disposed valve assembly is identical in construction with the casing just described, this casing 145 having a cut away port 146 permitting the flow of fluid past the valve casing into the interior of the sleeve portion 97. It also has side openings 148 providing communication with the interior of the casing and the openings 80 in the tubular rod portion and like the other valve casing has an extended outwardly flange 149 normally engaging the inner annular edge of the opening in flanged portion 98 of sleeve 96, the casing being urged into the normal position and yieldably held there by a spring 150 interposed between the casing 145 and the sleeve 107 which is maintained in contact with the plug 105 by said spring. From the aforegoing it will be seen that the normal position of the two casings of the two separate valve assemblies are maintained in their normal positions by their respective springs 140 and 150 so that the flanges 123 and 149 of said two casings are yieldably maintained against the respective portions of the tubular rod 50 and the sleeve 97 as shown in Fig. 2 of the drawings. The sleeve 145 is normally closed by the head portion 152 of the plug valve in casing 145 which is of identical construction as the plug valve of the other oppositely disposed valve assembly with the exception that this plug valve 152 has a pin extension 134 which is telescopically received by the corresponding tubular extension 103 of the oppositely disposed valve assembly. This telescopic engagement of the two plug valve portions maintain them in substantial coaxial alignment during the operation of either one of the valves. The flanges of the two oppositely disposed valve plugs are yieldably maintained in engagement with their respective sleeves or casings by a common spring 160 surrounding the pin and tubular extensions 134 and 133 of the respective valve plugs, this spring 160 being weaker than either of the springs 140 and 150 which hold their respective valve casings in normal position and yieldably resist movements of these casings out of normal position or away from their respective engaging rod and sleeve portions.

Fig. 5 illustrates the transparent tube 175 which visibly indicates the level of fluid within the fluid reservoir 31 of the shock absorber. As installed the shock absorber is in the horizontal position and when inactive, the fluid within the reservoir 31 may enter the transparent tube 175 through either one of the ducts 176 and thus visibly show the level of the fluid within the shock absorber. The two ducts 176 are so arranged that fluid may enter the sight tube 175 in either one of two positions, that is, with the sight gauge 175 either to the right as shown in Fig. 5, or to the left.

The reservoir 31 is not completely filled with fluid so that rod displacement and fluid expansion due to temperatures are compensated for.

The shock absorber, installed in the horizontal position and when at rest, will have its actual fluid level indicated by the sight gauge. Any necessary additional fluid for bringing the fluid level to the proper height may be added through either of the openings closed by the screw plugs 167.

In the present installation element 46 is operatively connected to the rotor hub which is the axis about which the shock absorber is rotated. This rotation produces a centrifugal force and causes the fluid in the shock absorber reservoir to be displaced so that its level is substantially transverse of the reservoir thereby causing a fluid head on the intake valves at the ends of the shock absorber whereby a compensating fluid supply is available during shock absorber operation.

As mentioned heretofore, the present shock absorber is designed and constructed for use on a helicopter, one to each blade of the rotor, and serves to dampen the lead and lag motions of the blade as said blade is rotated about its hub. These motions extend and compress the shock absorber, causing the piston to move relative to the cylinder and displace fluid from one side of the piston to the other.

If forces are set up tending to move the tubular rod 50 and its attached piston 51 on the rebound stroke or toward the right as regards Fig. 1, this movement of piston 51 will exert pressure upon the fluid within the cylinder rebound chamber 75 forcing the fluid from said chamber through the openings 81 into tubular rod 50. It will be noted that during this time ring-shaped disc valves 67 and 24, the former on the piston, the latter on the cylinder head member 21, are held in tight sealing engagement with their respective members so that fluid from the chamber 75 may not pass these valves. Fluid forced through the openings 81 in the tubular rod 50 enters the space between the casing portion 122 and the inner wall of the tubular rod 50, then passes through the openings 124 into the valve casing, exerting fluid pressure upon the head portion 131 of the plug valve in this casing urging it outwardly of the casing against the effect of spring 160 so as to move the flange 132 of this plug valve out of engagement with the casing thereof and thereby establishing a restricted fluid flow from the casing past the plug valve into the interior of the tubular rod 50 into which the radial passages 61 open. From the intermediate chamber the fluid will pass through the radial opening 61 into the interior chamber 54 of the piston 51 and from there the fluid will flow under pressure through the passages 63 moving the valve 65 out of engagement with the piston disc 52 and thereby permitting this fluid to enter the compression chamber 76 of the cylinder, the volume of which is being increased by the movement of the piston on its rebound stroke. If, due to any internal fluid leaks the fluid delivery from the rebound chamber 75 will not properly fill the compression chamber 76, now being enlarged, fluid may flow from the reservoir through the passages 37 in the cylinder head member 35 past the disc valve 38, normally closing said passage 37, into the chamber 76 providing a fluid replenishing supply which will adequately fill the compression chamber 76 as the piston moves on its rebound stroke. It will be noted that during this time the plug valve 152 which is not the active valve during this phase of the stock absorber operation will act as the abutment for the single intermediate spring 160. The inactive valve assembly including the plug valve 152 and its engaging cage 145 is bodily movable within the sleeve portion 97 against the effect of spring 150 tending yieldably to maintain said inactive valve assembly in its normal position as shown in Fig. 2. When the fluid pressure has moved the plug valve including the head portion 131 against the resisting efforts of the intermediate spring 160 sufficiently to compress said spring 160 so that it substantially balances the resisting effort of spring 150, then the entire valve assembly including the plug valve 152 and its engaging casing 145 will be moved bodily into sleeve portion 97 against the effect of spring 150. Under these circumstances both springs 160 and 150 cooperate for resisting movement of the plug valve, including head portion 131, away from its supporting valve cage and, therefore, the restriction to the fluid flow being transferred from chamber 75 to chamber 76 is restricted in accordance with the resistanace offered by the combined action of these two springs 160 and 150.

If the members between which the shock absorber is mounted cause the tubular rod 50 and its attached piston 51 to be moved in the opposite direction, that is, toward the left as regards Fig. 1, then fluid within the compression chamber 76 will have pressure exerted upon it causing the ring disc valve 65 to be more tightly pressed upon the disc 52 to close passages 60 so that the fluid now under pressure in chamber 76 will pass from said chamber to openings 80 in the tubular rod 50 thence through the openings 99 in the sleeve portion 97 into the interior of said sleeve portion where the casing of the fluid control device is located. From the openings 99 in the sleeve portion 97 fluid will pass through opening 148 in the valve casing to the interior thereof, this fluid under pressure being exerted upon the head portion of the plug valve 152 causing said valve to be moved against the effect of the common spring 160 so that the flange thereof will be disengaged from the casing and a restricted fluid flow from said casing past the plug valve 152 into the intermediate portion of the tubular rod 50 will be established. From this intermediate chamber within the tubular rod 50 the fluid will be forced under pressure through the radial opening 61 in the interior chamber of the piston and thence through passages 64 in piston disc 53, past the ring valve 61 into the rebound chamber 75 which is now being increased in area due to the movement of the piston on its compression stroke. The plug valve 152 moved by fluid pressure will compress the spring 160 until its resistance to compression equals the resistance offered by spring 140 to the movement of the valve casing 122 including the plug valve having head portion 131 at which time continued increasing fluid pressure will cause movement of the casing 122 containing said plug valve against the effect of spring 140 at which time both springs 160 and 140 will cooperate to resist opening movements of the plug valve 152, thereby establishing a predetermined resistance by plug valve 152 to the fluid flow under pressure past said valve into the intermediate chamber. From this it may be seen that while one of two separate fluid flow control assemblies within the tubular rod 50 is active under fluid pressure to establish restricted fluid flow, the other fluid flow control assembly acts as a spring loaded, movable abutment for the common spring which resists opening movement of the active valve. For a predetermined restriction to fluid flow through the active valve, the spring 160 is in sole control. However, when said spring has been compressed so that its resistance to valve opening movement balances the resistance of the holding spring, holding the inactive valve in normal position, then both the common spring 160 and the holding spring of the inactive valve mechanism coact to provide a predetermined resistance to continued movement of the active fluid flow control valve for providing the proper restricted fluid flow between the respective displacement chambers of the cylinder.

If, for any reason, the inactive cylinder chamber, or more specifically, the cylinder chamber being enlarged does not receive a sufficient supply of fluid from the chamber from which fluid is being discharged, then the intake valve on either one of the end head members may become effective to introduce a replenishing supply of fluid from the reservoir into the fluid receiving chamber.

Where temperature conditions in a non-operating device cause an undue expansion of the fluid within the two displacement chambers, thereby substantially increasing pressure therein, pressure due to fluid expansion may be relieved by the spring loaded pressure relief valve 108. Any fluid pressure in either chamber will be directed through the opening 146 in the valve casing, including the plug valve 152, the fluid then entering within the confines of the sleeve member 97 and forcing the valve 108 into its open position so that the fluid may be discharged within the sleeve 197 past valve 108 and be directed through the open end of the tubular rod 50 into the interior of the clevis 45 from whence it will pass through openings 48 in the cylinder head member extension 42 into the fluid reservoir 31. Any excess pressure in chamber 75 of the cylinder due to expansion thereof can be discharged through the openings 81 and 124 past the valve flange 132 on plug 131 into the intermediate chamber of the tubular rod 50 thence through the openings 61 therein into the interior chamber 54 of the piston, the fluid then passing through the passages 60 in the piston disc portion 52 past the valve 61 on said disc portion in the chamber 76 from whence it will be discharged as aforedescribed.

The present design and construction permits reduction in size inasmuch as in this instance the fluid flow control devices of the shock absorber are contained within the piston supporting rod and therefore need not be located in the exterior cylinder end head members or similar partitions provided in the ordinary shock absorber. The two fluid flow control devices for regulating the transfer of fluid in either direction between two fluid displacement chambers of the cylinder are under the influence of three springs, a single common spring acting upon both fluid control devices to maintain them closed and resist opening movement thereof in response to fluid pressure while the other two springs act as holding springs, one for each fluid flow control device and are used for secondary springs cooperating with the common spring to resist opening of the respective fluid flow control devices at a predetermined increase of fluid pressure whereby predetermined restriction to fluid pressure flow from one chamber to another is obtained so that the shock absorber may offer the desired and necessary resistance to movements of members between which it is connected.

While the embodiment of the present invention as herein disclosed, constitutes a preferred form, it is to be understood that other forms might be adopted.

What is claimed is as follows:

1. An hydraulic shock absorber comprising a fluid reservoir; a cylinder in communication with said reservoir and having end heads thereon; a piston forming two fluid chambers in said cylinder; a tubular rod supporting the piston and slidably supported in the end heads of the cylinder; two oppositely disposed and oppositely acting axially movable valve assemblies in said rod, each of said assemblies having a valve element and a seat element resiliently retained in position relative to each other, each valve of said assemblies being in communication with both cylinder chambers for controlling the transfer of fluid therebetween, one valve being effective to control fluid flow as the piston and rod move in one direction and the other valve as the piston and rod move in the opposite direction; two springs, each engaging a respective valve assembly and holding it against axial movement in normal position in the rod; and a common spring interposed between the valves of said assemblies predeterminately weaker than either of the hold springs, the compression rate of the weaker spring being such that a predetermined point in the opening movement of one valve in response to fluid pressure the other valve assembly will be moved bodily against the effect of its holding spring at which time both the hold spring and the common spring cooperate to control the pressure actuated valve.

2. An hydraulic shock absorber comprising a cylinder having end heads; a fluid reservoir in communication with said cylinder through both end heads thereof; a piston in the cylinder forming two fluid displacement chambers therein; a tubular rod slidably supported in the end heads of the cylinder and having the piston attached thereto, said piston providing valved communication between the interior of the rod and the two displacement chambers; a closure member adjacent each end of the tubular rod; two oppositely acting valve assemblies movably supported within said tubular rod; a holding spring interposed between each valve assembly and the adjacent closure member in the rod, each spring yieldably holding the respective assembly in normal position within the tubular rod and resisting movement of the assembly toward said adjacent closure member; each valve assembly comprising a tubular housing slidably supported within the tubular rod and urged against a positive stop within said rod by the hold spring interposed between said tubular housing and the adjacent rod closure member, the interior of each tubular housing being in communication with a respective cylinder fluid displacement chamber through openings in said tubular housing and the tubular rod, the adjacent ends of the two spaced tubular housings of the valve assemblies each being engaged and normally closed by a plug valve extending through and slidably supported by said tubular housing, the adjacent ends of said plug valves having on one a tubular extension and on the other a plug extension which telescopically engage so as to be relatively movable; and a common spring surrounding said plug valve extensions and engaging the plug valves yieldably to hold them in closing engagement with their respective tubular housings in which they are supported.

3. An hydraulic shock absorber comprising a cylinder each end of which is provided with a head member having a valve port; a fluid reservoir in communication with said cylinder through the valved ports of said head members; a tubular rod extending axially through the cylinder and slidably supported in said head members, said rod having end closure members and an outwardly extending, annular flange substantially intermediate its ends, said flange having radial openings providing communication between the cylinder and the interior of the rod; a piston in the cylinder attached to the rod, and forming two displacement chambers in the cylinder, said piston consisting of two centrally apertured discs fitting about the rod, each engaging a side of the annular flange and clamped thereupon by means engaging both discs and operative to draw them together and against said flange, each disc having a plurality of through passages and supporting a spring loaded, ring valve which normally closes the passages in the respective disc engaged thereby, each ring valve being operative by fluid pressure, when its respective disc acts as the trailing end of the reciprocating piston, for opening communication between the interior of the tubular rod and the cylinder chamber adjacent the trailing end of the piston; and fluid flow control devices movably supported within the tubular rod one on each side of the radial openings therein, each device being in communication with a respective cylinder displacement chamber and yieldably held against movement in the rod by a spring interposed between the respective device and its adjacent rod closure member, both devices being yieldably held in fluid flow closed position by a common spring interposed between both control devices and constantly engaging them.

4. An hydraulic shock absorber comprising a cylinder in communication with a fluid reservoir; a piston in said cylinder dividing it into two fluid displacement chambers said piston being attached to a tubular rod having end closure members and slidably supported in end heads provided on the cylinder, the piston having valved passages providing communication between the respective displacement chambers and a radial opening in the tubular rod leading to the interior thereof; oppositely disposed fluid flow control devices slidably supported in the tubular rod one on each side of the radial opening therein, each device comprising a tubular casing slidable axially in the rod, each casing being yieldably held against a positive stop in the tube by a holding spring interposed between the casing and the adjacent closure member of the rod, a plug valve slidable in each valve casing, the adjacent ends of said plug valves having annular flanges engaging the respective casings to close them and having extensions, one tubular, the other a stem telescopically engaging the tubular extension; a spring engaging the valve flanges and surrounding the telescopically engaging extensions of said plug valves, said spring being weaker than either holding spring and resisting movement of either plug valve by fluid pressure, the intermediate portion of each plug valve being of reduced diameter providing a chamber within the casing which is in communication with a respective cylinder displacement chamber through openings in the casing and tubular rod respectively, the portion of each plug valve adjacent its annular flange having a tapering flat surface descending from the inner edge of the flange to the reduced diameter portion; and means on the rod, outside the casing for reciprocating said rod.

5. An hydraulic shock absorber comprising a cylinder closed at its ends and containing a piston which forms two fluid displacement chambers therein, said piston being mounted upon a tubular rod which is slidably supported in the end closure members of the cylinder and has two openings providing communication between the interior of the tube and the respective fluid displacement chambers and an intermediate opening communicating with two oppositely disposed valved passages in the piston each of which open into a respective displacement chamber; and two separate, oppositely acting fluid flow control devices in the tubular rod, each operative by fluid pressure in a respective displacement chamber for establishing a predeterminately restricted fluid flow from said chamber, through the tubular rod and the piston into the other displacement chamber, each device being yieldably held against movement out of normal position within the rod by a separate holding spring and in fluid circuit closing position by a common spring interposed between said devices, said common spring being initially effective within a predetermined range of fluid pressure, to control opening of a device for establishing a restricted fluid flow, the holding spring engaging the other inactive device cooperating with said common spring, after the active device has reached a predetermined point in its opening movement, for controlling the transfer of fluid between displacement chambers through said active device.

6. An hydraulic shock absorber comprising a cylinder; a fluid reservoir communicating with said cylinder; a piston in the cylinder forming two fluid displacement chambers therein said piston being attached to a tubular rod; two oppositely acting fluid flow control devices within said rod, said devices being operative to control the transfer of fluid between said chambers in response to reciprocation of the piston in one direction and the other respectively; a separate spring yieldably holding each device in normal position within the tubular rod and resisting the movement of said device in one direction; a common spring yieldably holding both devices closed, one of said devices when inactive being operative as a spring loaded, movable abutment for the common spring as it controls the opening by fluid pressure of the other device when active whereby both springs successively and progressively control the action of the active device.

7. An hydraulic shock absorber comprising a cylinder; a fluid reservoir communicating with said cylinder; a piston in the cylinder forming two fluid displacement chambers therein, said piston being attached to a tubular rod; two spaced and oppositely acting fluid flow control devices movably supported within said tubular rod, the movements of said devices, one away from the other, being resisted by holding springs engaging the respective devices; a single spring interposed between said devices and yieldably maintaining each closed against fluid flow therethrough, said single spring being weaker than the first mentioned holding springs and thereby solely controlling the action of the fluid pressure operated device until the resistance of the single spring equals the resistance offered by the holding spring of the inactive device, after which both the single spring and the holding spring cooperate to control the pressure actuated device.

8. An hydraulic shock absorber comprising a cylinder provided with end heads and having a piston forming two fluid displacement chambers therein, said piston being mounted upon a tubular rod slidably supported in said end heads, said chambers being in communication with the interior of the rod; fluid flow control mechanism slidable within the rod and operative to control the transfer of fluid from one displacement chamber into the other as the piston is reciprocated, said mechanism consisting of two oppositely acting valves each yieldably maintained in predetermined normal spaced relation by a spring which resists movement of its engaged valve out of normal position to a greater degree than a common spring interposed between and engaging both valves yieldably resists the opening of either one of the valves.

9. A shock absorber in accordance with claim 8 in which an additional, spring loaded pressure relief valve is provided at one end of the tubular rod and operative to establish a fluid flow from said rod at a pressure exceeding predeterminedly the total pressure necessary to open either one of the two oppositely acting valves operating against both the springs concurrently.

10. An hydraulic shock absorber comprising a cylinder; a fluid reservoir communicating with said cylinder; a piston forming two fluid displacement chambers in said cylinder; two separate fluid flow control devices each operative to control the transfer of fluid from a respective chamber into the other chamber, each device being yieldably held in a normal position by a separate resilient element; a common resilient element engaging both devices and yieldably maintaining them in fluid circuit closing positions, said common resilient element exerting a lesser force against both devices than either one of the two separate resilient elements exert upon the respective devices.

11. A device in accordance with claim 10 in which both displacement chambers are in communication with the fluid reservoir through a passage provided with a spring loaded pressure relief valve, the spring pressure thereupon to close said passage, being predeterminedly greater than the pressure of the fluid necessary to overcome the total pressure of the resilient elements tending simultaneously to close the separate fluid flow control devices.

References Cited in the file of this patent

UNITED STATES PATENTS

| 2,138,513 | Rossman et al. | Nov. 29, 1938 |
| 2,225,986 | Glezen | Dec. 24, 1940 |
| 2,343,478 | Rossman | May 7, 1944 |
| 2,604,953 | Campbell | July 29, 1952 |

FOREIGN PATENTS

| 279,611 | Germany | Oct. 24, 1914 |